US006757373B1

(12) United States Patent
Rubinstein et al.

(10) Patent No.: US 6,757,373 B1
(45) Date of Patent: Jun. 29, 2004

(54) SWITCHING CORE CONTROLLER FOR DIGITAL CROSS-CONNECT SYSTEM, AND MODES OF OPERATING A SWITCHING CORE

(75) Inventors: Zvi Rubinstein, Raanana (IL); Simon Galler, Kfar-Sava (IL)

(73) Assignee: ECI Telecom Ltd., Petach Tikva (IL)

( * ) Notice: Subject to any disclaimer, the term of this patent is extended or adjusted under 35 U.S.C. 154(b) by 189 days.

(21) Appl. No.: 09/671,482

(22) Filed: Sep. 27, 2000

Related U.S. Application Data

(63) Continuation-in-part of application No. 09/234,458, filed on Jan. 21, 1999, now abandoned.

(51) Int. Cl.[7] .............................................. H04M 7/00
(52) U.S. Cl. .................. 379/221.01; 379/243; 370/356
(58) Field of Search ........................ 379/201.01, 201.02, 379/201.12, 211.01, 219, 220.01, 221.01–221.12, 224, 229, 230; 370/351–360, 384, 385, 386; 710/305, 316

(56) References Cited

U.S. PATENT DOCUMENTS

| | | | | |
|---|---|---|---|---|
| 5,220,560 A | * | 6/1993 | Ogasawara | ................. 370/466 |
| 5,933,490 A | * | 8/1999 | White et al. | ............. 29/603.14 |
| 6,064,653 A | * | 5/2000 | Farris | ......................... 370/237 |
| 6,134,235 A | * | 10/2000 | Goldman et al. | ........... 370/352 |
| 6,282,190 B1 | * | 8/2001 | Helfand | ...................... 370/352 |
| 6,282,192 B1 | * | 8/2001 | Murphy et al. | ............. 370/238 |
| 6,289,707 B1 | * | 9/2001 | Saarenko | ..................... 72/177 |
| 6,327,258 B1 | * | 12/2001 | Deschaine et al. | .......... 370/356 |
| 6,363,065 B1 | * | 3/2002 | Thornton et al. | ........... 370/352 |
| 6,370,145 B1 | * | 4/2002 | Dally et al. | ................. 370/389 |
| 6,389,005 B1 | * | 5/2002 | Cruickshank | ............... 370/352 |

FOREIGN PATENT DOCUMENTS

| | | |
|---|---|---|
| WO | 97/38551 | 10/1997 |
| WO | 97/39563 | 10/1997 |
| WO | 00/44192 | 7/2000 |

OTHER PUBLICATIONS

Atai et al., "Architectural Solutions to Internet Congestion Based on SS7 and Intelligent Network Capabilities", *Bellcore*, 1–18, (1997).
Gordon et al., "Economics of Internet Offload and Voice/Data Intergration", *Bellcore*, 1–17, (1998).
IETF, "the Internet Engineering Task Force", *IETF Home Page*, 1–57, Nov. 9, 1998.
Morgan et al., "The Internet and the Local Telephone Network: Conflict and Opportunities", *IEEE Communations Magazine*, 42–48, (1998).
ADC NewNet, "Single board solution for implementing SS7 application", *ADC NewNet Production*, p. 1, (1998).
TRILLIUM, "Trillium Advanced Portability Architecture", *Trillium Digital Systems, Inc.*, 1–2, (1999).
"DGM&S TELECOM", *DGM&S Telecom—SS7, Unix, Telephony, Signal W . . .* , 1–9, (1993–1999).
Pierrot et al., "The HP OpenCall SS7 Platform", *Hewlett–Packard Journal*, 7:1–10, (1997).
"MicroLegend SS7 Tutorial", *MicroLegend SS7 Tutorial*, 1–3, (1997–1998).
Arango et al., "Media Gateway Control Protocol (MGCP)", *Internet Draft*, 58–88, (1998).

* cited by examiner

Primary Examiner—Roland G. Foster
(74) Attorney, Agent, or Firm—Browdy and Neimark

(57) ABSTRACT

A switching core controller for controlling one or more Digital Cross-connect Systems (DCSs). A method for operating a switching core for pre-provisioning communication paths in anticipation of incoming calls. A method for routing a call to effect load balancing between mediation devices of a logical entity of at least two mediation devices.

60 Claims, 7 Drawing Sheets

SWITCHING CORE CONTROLLER FOR DIGITAL CROSS-CONNECT SYSTEM, AND MODES OF OPERATING A SWITCHING CORE

This application is a continuation-in-part of Ser. No. 09/234,458 filed Jan. 21, 1999 now abandoned.

FIELD OF THE INVENTION

The invention relates to switching core controllers for controlling switching cores, and modes of operation therefor.

BACKGROUND OF THE INVENTION

Digital Cross-connect Systems (hereinafter referred to as "DCSs"), for example, the T::DAX™ DCS commercially available from the proprietor of the present application, are regarded as so-called static switching devices due to their relatively slow switching capability in comparison to switches. DCSs are typically employed for slow switching purposes, for example, bandwidth management purposes, grooming, conversion between transmission standards, and the like.

In a Bellcore white paper entitled "Architecture Solutions to Internet Congestion Based on SS7 and Intelligent Network Capabilities" by Dr. Amir Atai and Dr. James Gordon, there are proposed several pre-ingress switch and post-ingress switch internet call offload architectures for reducing internet call traffic congestion in the Public Switched Telephone Network (PSTN). One particular post-ingress switch implementation is based on the deployment of a Class 4 Tandem Replacement Switch with Signaling System No. 7 (SS7) capabilities, for example, the ICS2000 Integrated Convergence Switch commercially available from Convergent Networks, GSX9000 Open Services Switch commercially available from Sonus, amongst others (see FIG. 1). Such Tandem Replacement Switches are typified by a switching core having a high switching rate capability.

Dial up internet connection often requires several attempts before a successful connection is made, particularly during the internet call busy period between about 9 pm to midnight. To obtain an internet connection in the case of a busy tone, a subscriber may re-dial the same access number or try another dial up internet access telephone number of his ISP which is awkward and time consuming. One Present Mode of Operation (PMO) for "automatic" congestion control as opposed to the "manual" approach congestion involves rerouting of an internet call at one tandem switch and destined for an RAS pool connected to one of its egress switches to another RAS pool of the same ISP connected to an egress switch connected to another tandem switch (see FIG. 2). However, such congestion control requires Advanced Intelligent Network (AIN) and Signaling Control Point (SCP) capabilities which may not be supported by some PSTN Class 4/5 switches. Moreover, such congestion control typically only occurs when the originally destined RAS pool has reached saturation level i.e. no more transmission ports are available. Furthermore, such "automatic" congestion control often causes a snowballing effect in the signaling network generated by AIN queries.

SUMMARY OF THE INVENTION

In accordance with a first aspect of the present invention, there is provided a switching core controller for controlling at least one Digital Cross-connect System (DCS) each having a switching core, the controller comprising:

(a) at least one router for determining at least one communication path through at least one DCS in response to signaling information; and (b) at least one resource manager each interfacing with a router of said at least one router for providing instructions for communication path establishment and tear down in the switching core of an DCS of said at least one DCS in response to said signaling information.

By virtue of the first aspect of the present invention, a Digital Cross-connect System (DCS) is effectively converted to a so-called skinny PSTN Class 4 switch having signaling information capabilities. The Switching Core Controller (SCC) of the first aspect of the present invention enables an DCS to be employed for certain service applications including inter alia offloading internet calls from the PSTN, call tapping, and the like, in place of higher switching rate switches. The SCC can be operated in accordance with several modes of operation, for example, a pre-provisioning mode of operation in accordance with a second aspect of the present invention, a load balancing mode of operation in accordance with a third aspect of the present invention, amongst other. The operation of the SCC can be managed in accordance with different management allocation schemes to cater for different loading, for example, the voice call business busy hour at about midday, the voice call residential busy hour at about 5 pm, the internet call residential busy hour between about 9 pm and midnight, weekends as opposed to weekdays, and the like. Management allocation schemes can also reflect different Service Level Agreements (SLAs) between a subscriber and a carrier, desired Grades of Service (GoSs), and the like. The SCC can be implemented for interfacing the DCS with any one of a number of signaling networks including inter alia Q.293 1, MGCP/H.248, Q.SIG, and the like.

In accordance with a second aspect of the present invention, there is provided a method for operating a switching core with at least three interfaces including at least two I/O interfaces with each interface having at least one transmission port, and a switching fabric capable of connecting a pair of transmission ports of two different interfaces of the at least three interfaces for provisioning an end-to-end communication path for passing a particular class of calls of at least two classes of calls through the switching core, the method comprising the steps of:

(a) on the condition that the class of an incoming call matches the class of a pre-provisioned communication path at which it arrives, the pre-provisioned communication path being in accordance with a prevailing management allocation scheme passing the incoming call along the pre-provisioned communication path; otherwise (b) tearing down the pre-provisioned communication path and replacing it with a new communication path employing the transmission port at which the incoming call arrives, and having a class matching that of the incoming call, and tearing down the new communication path at the termination of the incoming call.

The method in accordance with the second aspect of the present invention is based on the notion that the switching activity of a switching core can be reduced by pre-provisioning communication paths in anticipation of incoming calls which would otherwise effect their establishment, thereby enhancing its switching capability as perceived by a calling party in terms of Grade of Service (GoS), and the like. Moreover, pairs of transmission ports of are preferably continuously being matched as they become available after the tear down of new communication paths such that the number of available communication paths in the absence of any calls passing through the switching core equals the number of pre-provisioned communication paths under a prevailing management allocation scheme.

By virtue of the proposed Future Mode of Operation (FMO) of a switching core in accordance with the second aspect of the present invention, a hitherto employed Tandem Replacement Switch in a post-ingress switch internet call off-loading architecture can be replaced by a less expensive Digital Cross-connect System (DCS), such as the above-mentioned T::DAX™ DCS, without severely impairing the GoS as perceived by a calling party, if at all. Moreover, a switch can be operated in accordance with the proposed FMO in accordance with the second aspect of the present invention, thereby rendering a greater utilization of its inherent high switching rate capability.

In accordance with a third aspect of the present invention, there is provided for a method for routing a call to a transmission port of a mediation device of a pool of at least one mediation device of a logical entity of at least one pool where each of the at least one mediation device of a pool is connected to the same switching core and a logical entity includes at least two mediation devices, the method comprising the steps of:

(a) upon arrival of an incoming call, determining the transmission ports available for handling the incoming call at each of the mediation devices of the logical entity to which the incoming call is directed; and (b) routing the incoming call to one of the available transmission ports of the logical entity in accordance with a prevailing load balancing allocation scheme.

The method in accordance with the third aspect of the present invention takes advantage of the fact that the occupancy level of the transmission ports of an interface of a switching core having a signaling network interface is known by the signaling gateway, thereby enabling load balancing between mediation devices logically grouped into logical entities for improving their utilization. The term "load balancing allocation scheme" should be interpreted broadly and not necessarily that the loads are equally balanced between two or more mediation devices. For example, a load balancing allocation scheme can restrict the routing of an incoming call to a sub-set of the available transmission ports of a logical entity. Other allocation schemes can be dependent on the availability of transmission ports of a logical entity, the time of day, SLAs between a subscriber and an ASP, and the like.

The division of mediation devices into logical entities can take into consideration several factors including inter alia the geographical spread of the mediation devices, the geographical spread of the switching cores, the trunks connecting the mediation devices and/or the switching cores, network planning considerations, and the like. As such, one or more network resource management layers are effectively created to manage mediation devices in a fully transparent manner from the point of view of calling parties and/or the carriers including inter alia ILECs, CLECs, ISPs, and the like. A mediation devices can be a RAS pool, a voice switch, an ATM switch, a multi-service switch, and the like.

A particular implementation of the third aspect of the present invention is for load balancing between an ISP's RAS pools located in business areas and residential areas since an RAS pool is more heavily employed either during office hours or after office hours depending on whether its dial-up connection telephone number belongs to an egress switch located in a business area or a residential area. A natural development of such load balancing is that an ISP can allocate a single internet dial up connection telephone number to all its subscriber's irrespective of their geographical location.

BRIEF DESCRIPTION OF THE DRAWINGS

In order to understand the invention and to see how it can be carried out in practice, preferred embodiments will now be described, by way of non-limiting examples only, with reference to the accompanying drawings, in which similar parts are likewise numbered, and in which.

DETAILED DESCRIPTION OF THE DRAWINGS

Figure 1:
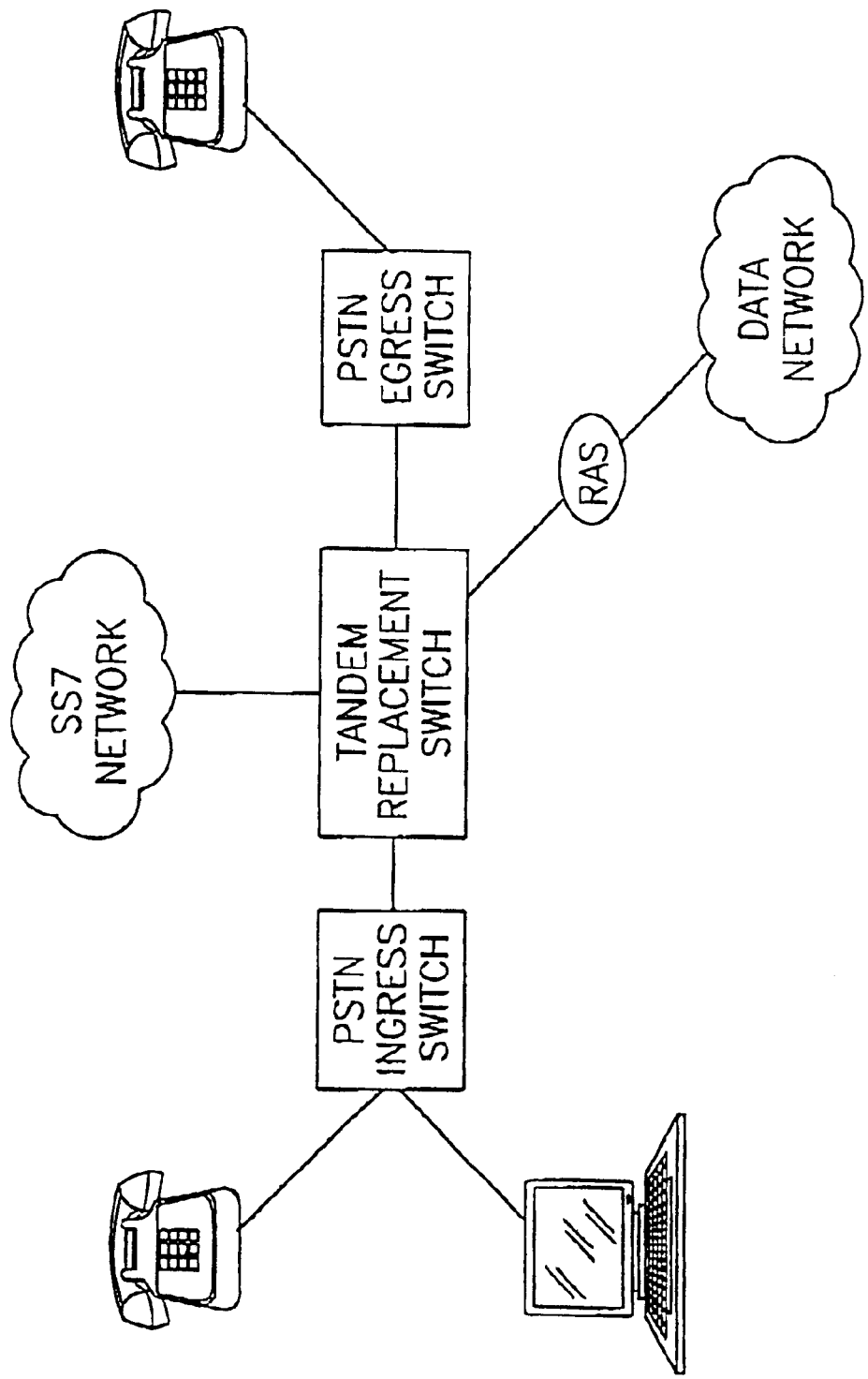
FIG. 1 is a schematic representation showing a conventional post ingress switch internet call offloading architecture.
Figure 2:
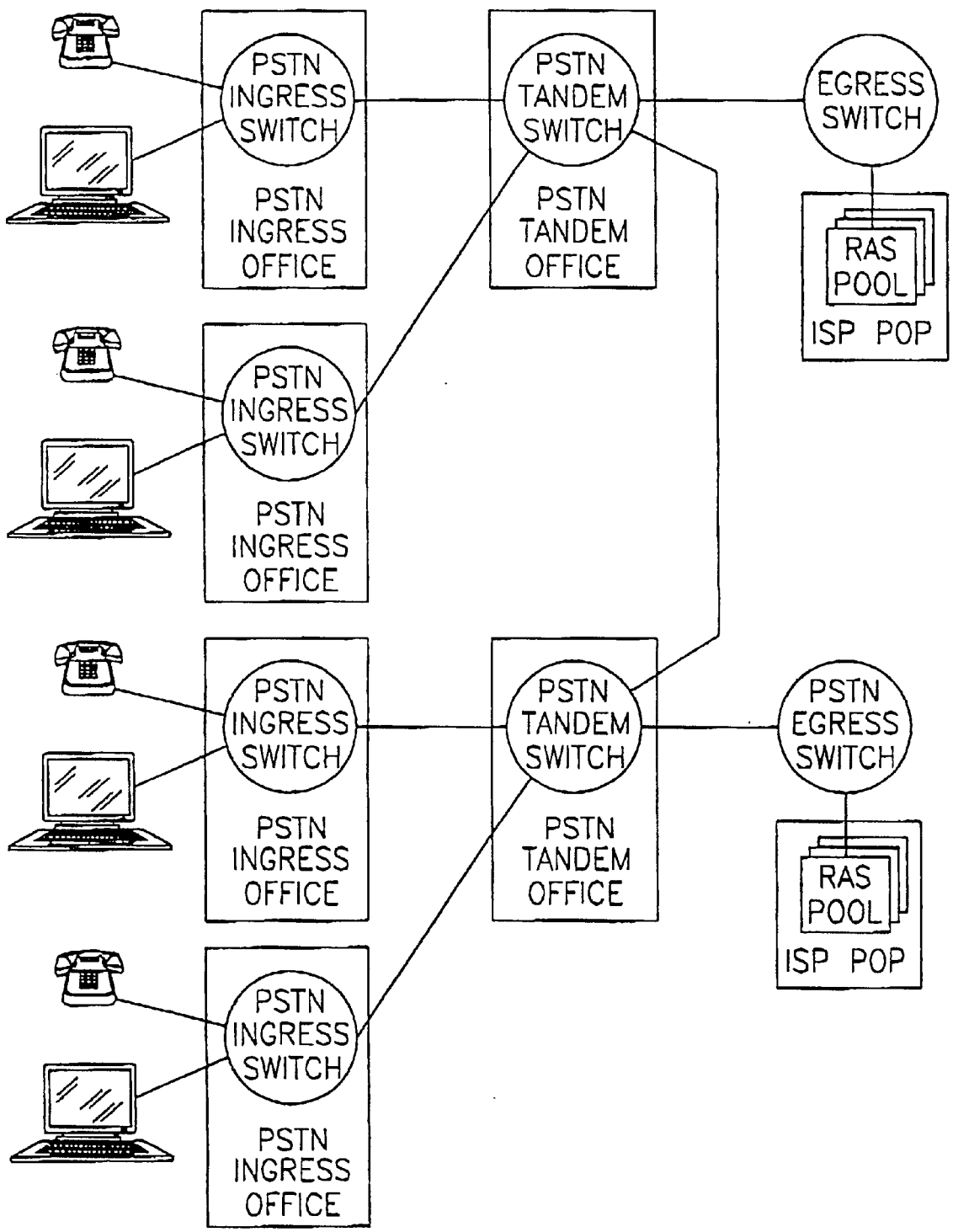
FIG. 2 is a schematic representation showing a conventional internet call congestion control architecture.
Figure 3:
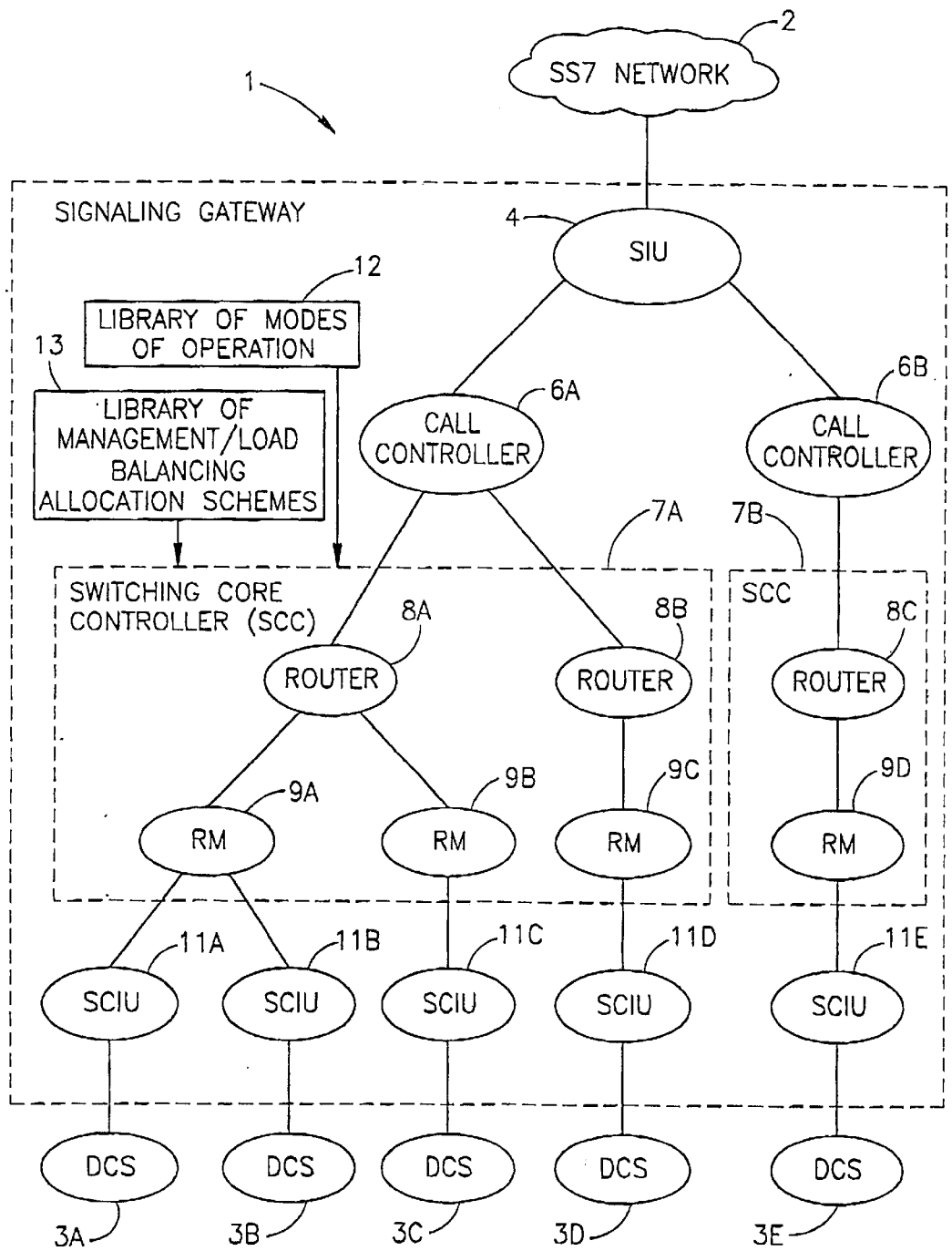
FIG. 3 is a schematic representation showing a signaling gateway for interfacing a Digital Cross-connect System (DCS) with a signaling network.

FIG. 3 shows a signaling gateway 1 interfacing with the Signaling System 7 (SS7) network 2 (constituting a signaling network) for controlling five Digital Cross-connect Systems (DCSs) 3A, 3B, 3C, 3D, and 3E, for example, the T::DAX™ DCS commercially available from the proprietor of the present application. The signaling gateway 1 can be functionally considered as having four functional entities as follows Signaling Interface Unit (SIU) 4, a call controller 6, a Switching Core Controller (SCC) 7 including at least one router 8 each interfacing with one or more Resource Managers (RMs) 9, and a Switching Core Interface Unit (SCIU) 11.

Each SCC 7 includes a library of modes of operation 12 for operating an DCS 3, for example, pre-provisioning of communication paths in accordance with a management allocation scheme, a load balancing between mediation devices in accordance with a load balancing allocation scheme, amongst others. An SCC 7 also includes a library of management/load balancing allocation schemes 13, for example, one exemplary management allocation scheme suitable for one or both voice call busy hours stipulates the pre-provisioning of the maximum possible number of voice call communication paths, another exemplary management allocation scheme suitable for internet call residential busy hour stipulates the pre-provisioning of the maximum possible number of internet call communication paths IC1, IC2, and IC3, amongst others.

The SIU 4 has the same functionality as the TSU commercially available from Hewlett Packard, namely, interfacing with the SS7 network 2. The call controllers 6A and 6B have similar functionality as the Generic Call Control (GCC) module of the ICC software module commercially available from Trillium, namely, providing instructions for communication path establishment and tear down to a pair of SCCs 7A and 7B. Each SCC's router 8 determines call communication paths through its associated DCSs in response to the signaling information from the SS7 network 2. Each SCC's resource manager 9 provides instructions for communication path establishment and tear down in the switching core of its associated DCSs in response to the signaling information from the SS7 network 2. Each SCIU 11 translates the instructions for communication path establishment and tear down for transfer to its respective DCS 3.

Figure 4:
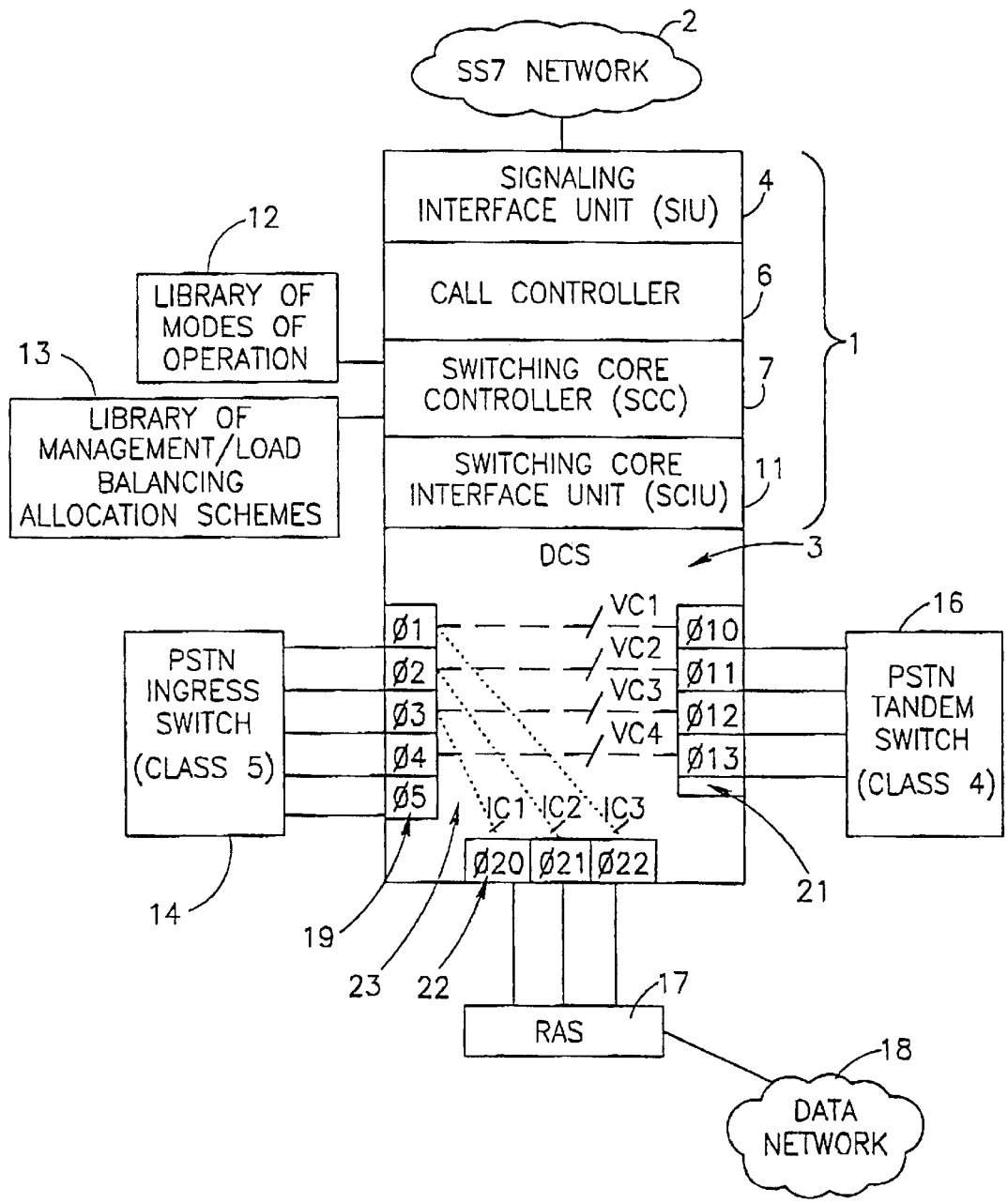
FIG. 4 is a schematic representation showing an DCS operative in accordance with the second aspect of the present invention.

FIG. 4 shows the deployment of the signaling gateway 1 and an DCS 3 for offloading internet calls from the PSTN, the DCS 3 being interdisposed between a Class 5 PSTN ingress switch 14, a Class 4 PSTN tandem switch 16, and an RAS 17 connected to a data network 18. The DSC 3 has an I/O interface 19 connected to the PSTN ingress switch 14, an I/O interface 21 connected to the PSTN tandem switch 16, and an I/O interface 22 connected to the RAS 17, and a switching fabric 23. The I/O interface 19 has five line side transmission ports numbered φ1, φ2, φ3, φ4, and φ5, the I/O interface 21 has four trunk side transmission ports numbered φ10, φ11, φ12, and φ13, and the I/O interface 21 has three transmission ports numbered φ20, φ21, and φ22.

The SCC 7 controls the provisioning of communication paths through the switching fabric 23 between pairs of transmission ports of the interfaces 19, 21 and 22 for passing voice calls (constituting one class of call) from the PSTN ingress switch 14 to the PSTN tandem switch 16 and internet calls (constituting another class of call) from the PSTN ingress switch 14 to the RAS 17 in accordance with signaling messages passing through the SS7 network 2. The maximum possible number of voice call communication paths between the interfaces 19 and 21 is four, four exemplary communication paths VC1, VC2, VC3, and VC4 being shown in dashed lines. The maximum possible number of internet call communication paths between the interfaces 19 and 22 is three, three exemplary communication paths IC1, IC2, and IC3 being shown in dotted lines.

Figure 5:
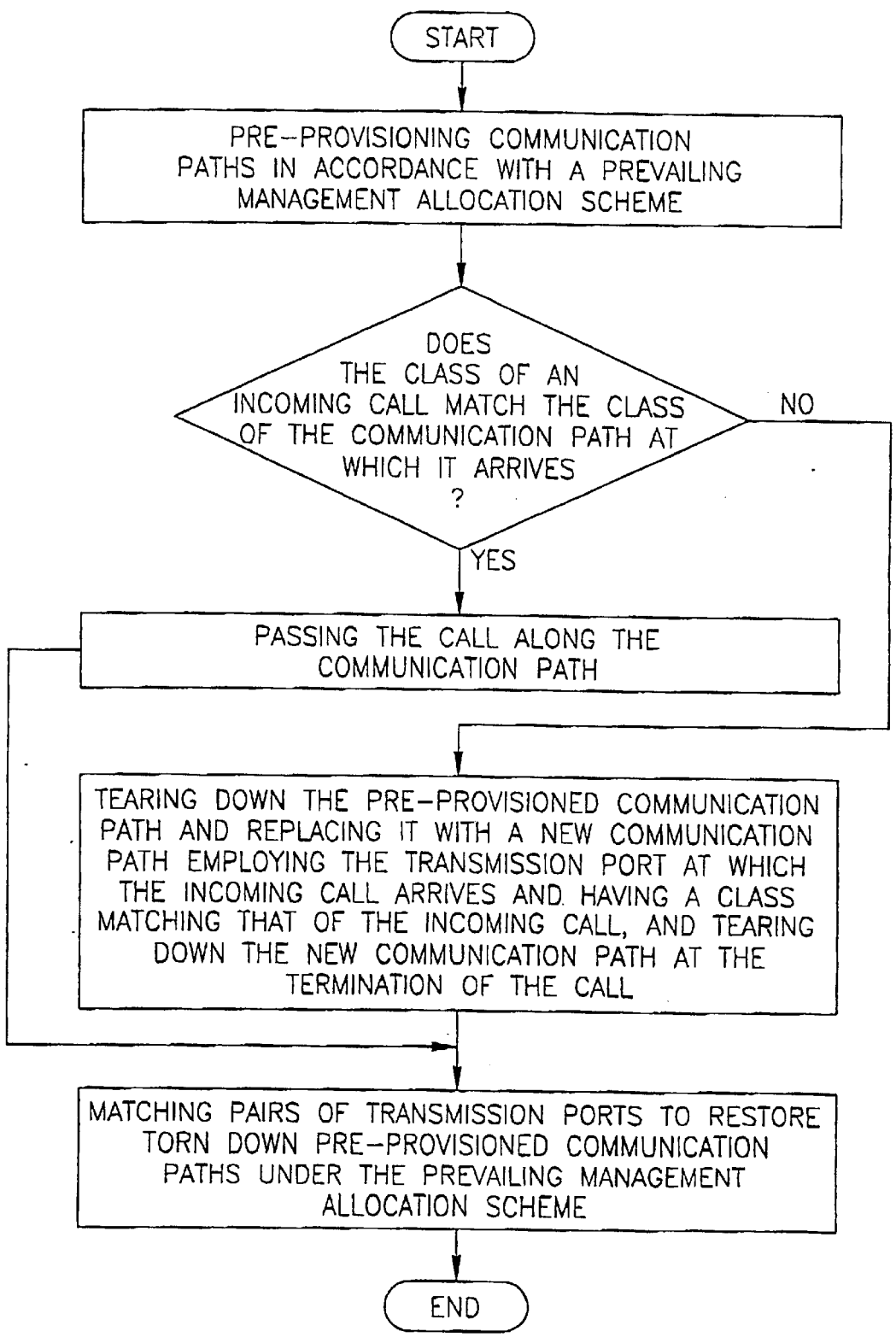
FIG. 5 is a flow diagram showing the operation of the DCS of FIG. 4.

The operation of the DCS 3 is now described with reference to FIG. 5 based on the assumption that the above-mentioned first exemplary management allocation scheme suitable for voice call business busy hour is the prevailing allocation scheme, and the SS7 network 2 is operative in its so-called Remote Maintenance Block (RMB) mode of operation as opposed to its so-called Busy Mode (BM) mode of operation. For the sake of conciseness, the present description avoids a detailed description of the signaling messages employed by the SS7 network 2 for call establishment and call tear down.

Assuming that for an instance there are no calls passing through the DCS 3, the SCC 7 sets up the four communication paths VC1, VC2, VC3, and VC4 in anticipation of incoming voice calls arriving at either the line side transmission ports φ1, φ2, φ3, and φ4 from the PSTN ingress switch 14, or the trunk side transmission ports φ10, φ11, φ12, and φ13 from the PSTN tandem switch 16 which, on their actual arrival, would pass through the switching fabric 23 without any additional switching activity. Against this, an internet call arriving at any one of the line side transmission ports φ1, φ2, φ3, and φ4 or alternatively at any one of the trunk side transmission ports φ10, φ11, φ12, and φ13, causes the SCC 7 to tear down the voice call communication path VCx and to establish an internet call communication path IC in its place employing the transmission port φx upon which the internet call arrived and one of the transmission ports φ20, φ21, and φ22. On termination of an internet call passing through the DCS 3, the SCC 7 attempts to pre-provision another voice call communication path such that the number of voice call communication paths when there are no calls passing through the DCS 3 equals the number of voice call communication paths stipulated by the prevailing management allocation scheme.

Figure 6:
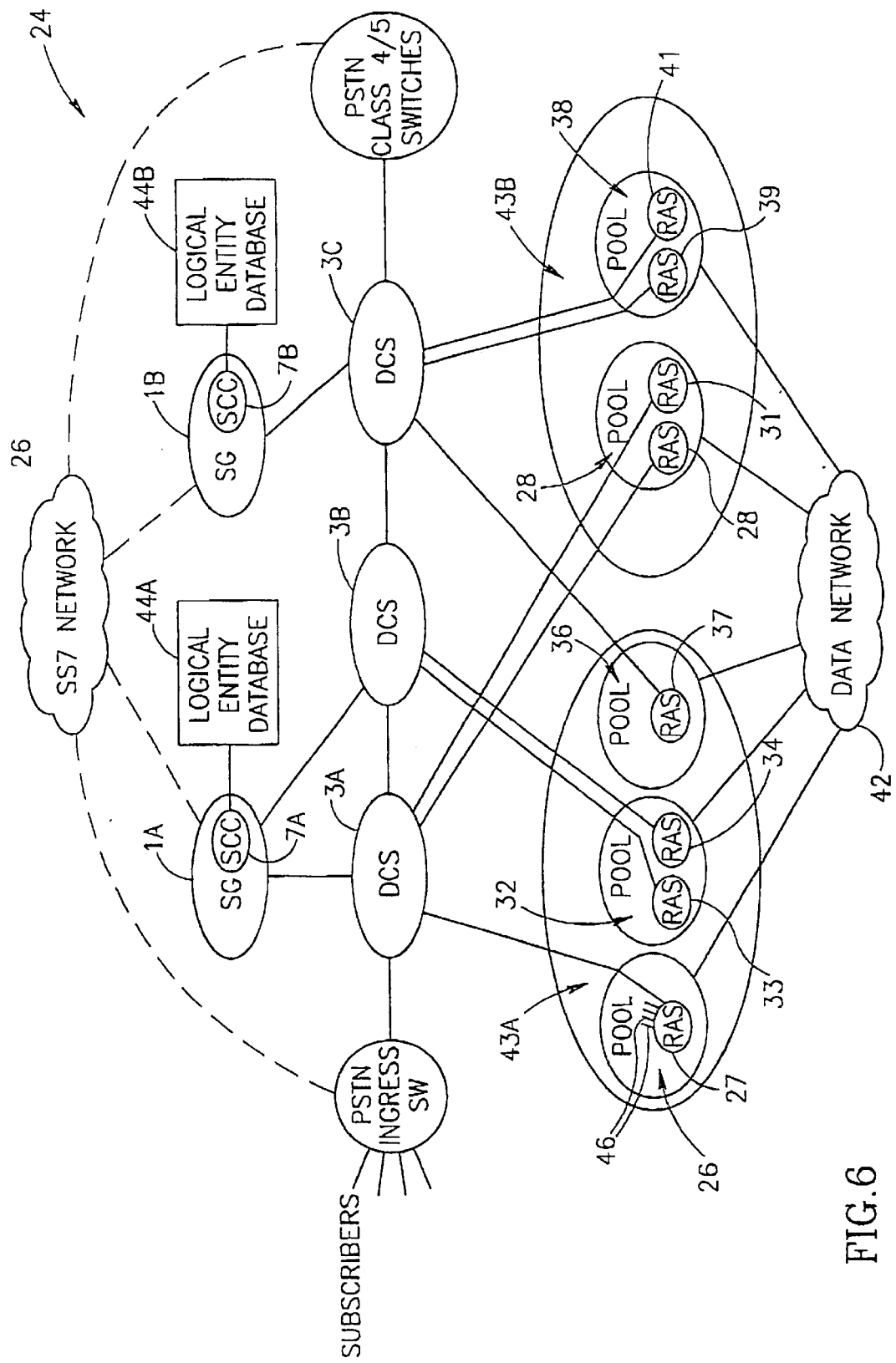
FIG. 6 is a schematic representation showing an DCS operative in accordance with the third aspect of the present invention.

FIG. 6 shows a telecommunication network 24 including a pair of signaling gateways 1A and 1B interfacing with the SS7 network and respectively having SCCs 7A and 7B, and operative to effective load balancing. The signaling gateway 1A controls two DCSs 3A and 3B whilst the signaling gateway 1B controls a single DCS 3C. The DCS 3A is connected to a pool 26 of a single RAS 27 and a pool 28 of a pair of RASs 29 and 31. The DCS 3B is connected to a pool 32 of a pair of RASs 33 and 34. The DCS 3C is connected to a pool 36 of a single RAS 37 and a pool 38 of a pair of RASs 39 and 41. The RASs are connected to a data network 42 such as an IP network, and are logically divided into two logical entities 43A and 43B as follows: the logical entity 43A includes three pools 26, 32 and 36 whilst the logical entity 43B includes two pools 28 and 29. Each signaling gateway 1 maintains a logical entity database 44 including a list of the logical entities in the telecommunication network 24, and the signaling gateway 1 responsible for the load balancing in each logical entity 43. A signaling gateway's logical entity database 44 also includes for each logical entity under its control, a list of the RASs in each pool of a particular logical entity, a list of the transmission ports of each RAS, and status of each of the transmission ports 46.

Figure 7:
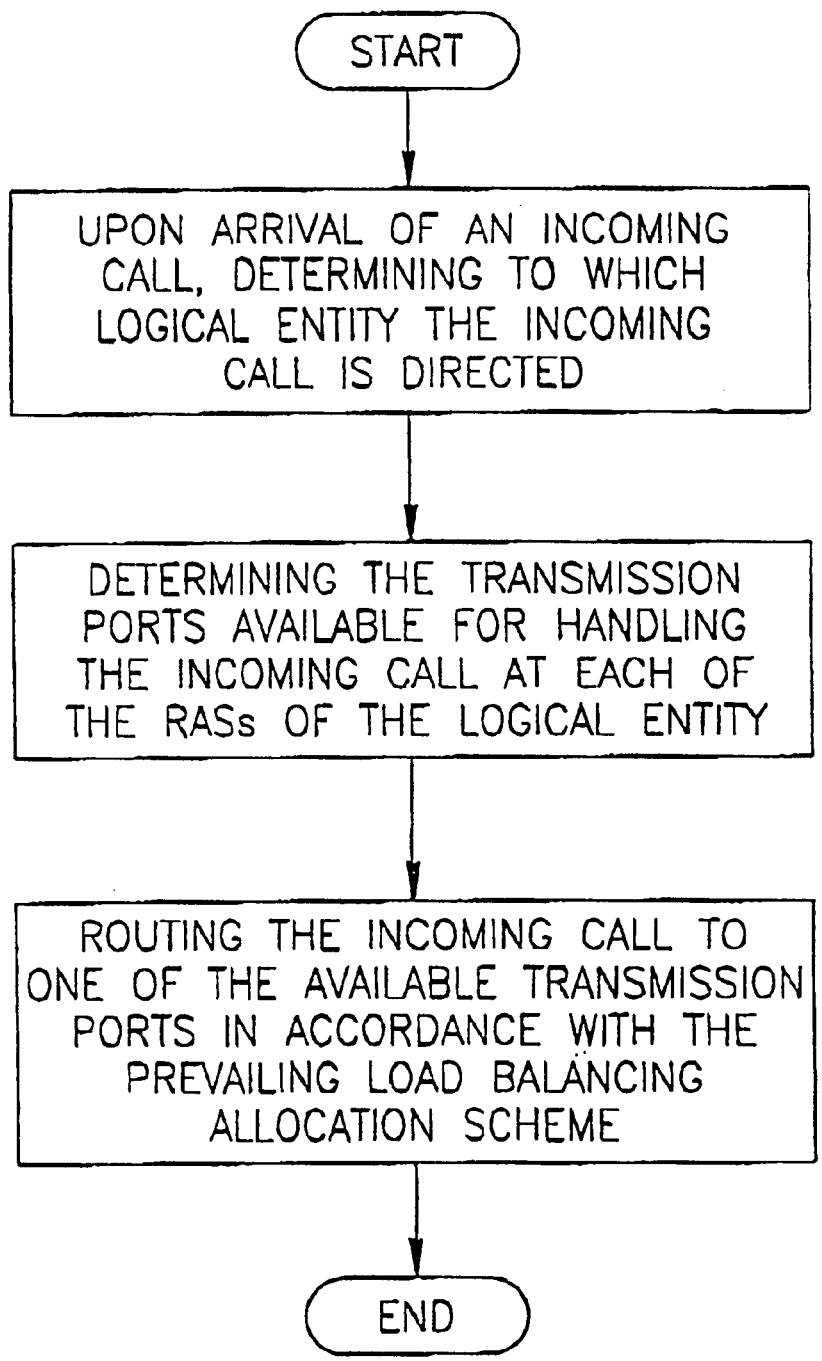
FIG. 7 is a flow diagram showing the operation of FIG. 6.

The operation of the telecommunication network 24 for load balancing between a logical entity's mediation devices is now described with reference to FIG. 7. First, upon arrival of an incoming call from a subscriber, the signaling gateway responsible for the load balancing of the logical entity to which the incoming call is directed is determined. Thereafter, the signaling gateway's SCC 7 determines the transmission ports available for handling the incoming call at each of the mediation devices of the logical entity, and routes the incoming call to one of the available transmission ports in accordance with a prevailing load balancing allocation scheme.

While the invention has been described with respect to a limited number of embodiments, it will be appreciated that many variations, modifications, and other applications of the invention can be made within the scope of the appended claims. The modes of operation of a switching core in accordance with the second and third aspect of the present invention can be equally applied to switching cores residing in switches, Tandem Replacement Switches, and the like. Moreover, the modes of operation of a switching core in accordance with the second and third aspects of the present invention are suitable for implementation in so-called "soft switch" technology.

What is claimed is:

1. A switching core controller for controlling at least one Digital Cross-connect System (DCS) each having a switching core, the controller comprising:

(a) at least one router for determining at least one communication path through at least one DCS in response to signaling information from a signaling network; and (b) at least one resource manager each interfacing with a router of said at least one router for providing instructions for communication path establishment and tear down in the switching core of an DCS of said at least one DCS in response to said signaling information;

the switching core controller being capable of executing the following steps:

(i) on the condition that the class of an incoming call matches the class of a pre-provisioned communication path at which it arrives the pre-provisioned communication path being in accordance with a prevailing management allocation scheme for passing a particular class of calls of at least two classes of calls through the switching core, passing the incoming call along the pre-provisioned communication path; otherwise (ii) tearing down the pre-provisioned communication path, and replacing it with a new communication path employing the transmission port at which the incoming call arrives and having a class matching that of the incoming call, and tearing down the new communication path at the termination of the call.

2. The controller according to claim 1 wherein at least two routers exchange routing information directly therebetween.

3. The controller according to claim 1 and further comprising a call controller for exchanging signaling information with the signaling network.

4. The controller according to claim 1 wherein the signaling network is the Signaling System 7.

5. The controller according to claim 1 and being capable of executing the following further step:

(iii) matching pairs of transmission ports as they become available such that the number of communication paths of a particular class of calls in the absence of any calls passing through the switching core equals the number of communication paths for that class under the prevailing management allocation scheme.

6. The controller according to claim 5 wherein a prevailing management allocation scheme fully utilizes the transmission ports of one of the two interfaces employed for the pre-provisioning of communication paths of a particular class of calls in the absence of any calls passing through the switching core.

7. The controller according to claim 1 for routing a call to a transmission port of a mediation device of a pool of at least one mediation device of a logical entity of at least one pool where each of the at least one mediation device of a pool is connected to the same switching core and a logical entity includes at least two mediation devices, and being capable of executing the following steps:

(a) upon arrival of an incoming call, determining the transmission ports available for handling the incoming call at each of the mediation devices of the logical entity to which the incoming call is directed; and (b) routing the incoming call to one of the available transmission ports of the logical entity in accordance with a prevailing load balancing allocation scheme.

8. The controller according to claim 7 wherein a pool includes at least two mediation devices.

9. The controller according to claim 7 wherein a logical entity includes at least two pools.

10. The controller according to claim 7 wherein a load balancing allocation scheme restricts the routing of an incoming call to a sub-set of the available transmission ports of a logical entity.

11. The controller according to claim 7 wherein a load balancing allocation scheme is dependent on the availability of transmission ports of a logical entity.

12. The controller according to claim 1 wherein an allocation scheme is dependent on a Service Level Agreement (SLA) between a subscriber and an Application Service Provider (ASP).

13. The controller according to claim 1 wherein an allocation scheme is temporally dependent.

14. A signaling gateway including a switching core controller according to claim 1.

15. A telecommunication switching device including a switching core controller according to claim 1.

16. A telecommunication system including a switching core controller according to claim 1.

17. A method for operating a switching core having at least three interfaces including at least two I/O interfaces with each interface having at least one transmission port, and a switching fabric capable of connecting pairs of transmission ports of two interfaces of the at least three interfaces for provisioning end-to-end communication paths for passing a particular class of calls selected from at least two classes of calls through the switching core, the method comprising the steps of:

(a) on the condition that the class of an incoming call matches a class of a pre-provisioned communication path at which it arrives, the pre-provisioned communication path being in accordance with a prevailing management allocation scheme, passing the incoming call along the pre-provisioned communication path; otherwise (b) tearing down the pre-provisioned communication path, and replacing it with a new communication path employing the transmission port at which the incoming call arrives and having a class matching that of the incoming call, and tearing down the new communication path on termination of the call.

18. The method according to claim 17 further comprising the step of:

(c) matching pairs of transmission ports as they become available such that the number of communication paths of a particular class of calls in the absence of any calls passing through the switching core equals the number of communication paths for that class under the prevailing management allocation scheme.

19. The method according to claim 18 wherein a prevailing service application fully utilizes the transmission ports of one of the two interfaces employed for the pre-provisioning of communication paths of a particular class of calls in the absence of any calls passing through the switching core.

20. The method according to claim 17 wherein an allocation scheme is dependent on the Service Level Agreement (SLA) between a subscriber and an Application Service Provider (ASP).

21. The method according to claim 17 wherein an allocation scheme is temporally dependent.

22. A switching core controller for operating a switching core including at least three interfaces including at least two I/O interfaces with each interface having at least one transmission port; and a switching fabric capable of connecting a pair of transmission ports of two interfaces of the at least three interfaces for provisioning an end-to-end communication path for passing a particular class of at least two classes of calls through the switching core; the controller being capable of executing the following steps:

(a) if the class of an incoming call matches the class of a pre-provisioned communication path at which it arrives, the pre-provisioned path being in accordance with a prevailing management allocation scheme, passing the incoming call along the pre-provisioned communication path; otherwise (b) tearing down the pre-provisioned communication path and replacing it with a new communication path employing the transmission port at which the incoming call arrives and having a class matching that of the incoming call, and tearing down the new communication path on termination of the call, and (c) matching pairs of transmission ports as they become available such that the number of communication paths of a particular class of calls in the absence of any calls passing through the switching core equals the number of communication paths for that class of calls under the prevailing management allocation scheme.

23. The controller according to claim 22 wherein a prevailing management allocation scheme fully utilizes the transmission ports of one of the two interfaces employed for pre-provisioning communication paths of a particular class of calls in the absence of any calls passing through the telecommunication system.

24. The controller according to claim 22 for routing a call to a transmission port of a mediation device of a pool of at least one mediation device of a logical entity of at least one pool where each of the at least one mediation device of a pool is connected to the same switching core and a logical entity includes at least two mediation devices, the controller being capable of executing the following steps:
(a) on arrival of an incoming call, determining the mediation device transmission ports available for handling the incoming call at each of the mediation devices of the logical entity to which the incoming call is directed; and
(b) routing the incoming call to one of the available transmission ports of the mediation devices of the logical entity in accordance with a prevailing load balancing allocation scheme.

25. The controller according to claim 24 wherein a pool includes at least two mediation devices.

26. The controller according to claim 24 wherein a logical entity includes at least two pools.

27. The controller according to claim 24 wherein a load balancing allocation scheme restricts the routing of an incoming call to a sub-set of the available transmission ports of the mediation devices of a logical entity.

28. The controller according to claim 24 wherein a load balancing allocation scheme is dependent on the availability of transmission ports of the mediation devices.

29. The controller according to claim 22 for controlling at least one Digital Cross-connect System (DCS), the controller comprising:
(a) at least one router for determining at least one communication path through at least one DCS in response to signaling information from a signaling network; and
(b) at least one resource manager each interfacing with a router of said at least one router for providing instructions for communication path establishment and tear down in a switching core of a DCS of said at least one DCS in response to said signaling information.

30. The controller according to claim 29 wherein at least two routers exchange routing information directly therebetween.

31. The controller according to claim 29 and further comprising a call controller for exchanging signaling information with the signaling network.

32. The controller according to claim 29 wherein the signaling network is the Signaling System 7.

33. The controller according to claim 22 wherein an allocation scheme is dependent on a Service Level Agreement (SLA) between a subscriber is and an Application Service Provider (ASP).

34. The controller according to claim 22 wherein an allocation scheme is temporally dependent.

35. A signaling gateway including a switching core controller according to claim 22.

36. A telecommunication switching device including a switching core controller according to claim 22.

37. A telecommunication system including a switching core controller according to claim 22.

38. A switching core controller for routing a call to a transmission port of a mediation device of a pool of at least one mediation device of a logical entity of at least one pool where each of the at least one mediation device of a pool is connected to the same switching core and a logical entity includes at least two mediation devices, the controller capable of executing the following steps:
(a) on the condition that the class of an incoming call matches the class of a pre-provisioned communication path at which it arrives, the pre-provisioned communication path being in accordance with a prevailing management allocation scheme for passing a particular class of calls of at least two classes of calls through the switching core, passing the incoming call along the pre-provisioned communication path; otherwise
(b) tearing down the pre-provisioned communication path, and replacing it with a new communication path employing a transmission port at which the incoming call arrives and having a class matching that of the incoming call, and tearing down the new communication path on termination of the call.

39. The controller according to claim 38 wherein a pool includes at least two mediation devices.

40. The controller according to claim 38 wherein a logical entity includes at least two pools.

41. The controller according to claim 38 and being capable of executing the following steps:
(a) on arrival of an incoming call, determining the transmission ports available for handling an incoming call at the logical entity to which the incoming call is directed; and
(b) routing the incoming call to one of the available transmission ports of the logical entity in accordance with a prevailing load balancing allocation scheme.

42. The controller according to claim 38 being capable of executing the following step:
(c) matching pairs of transmission ports as they become available such that the number of communication paths of a particular class of calls in the absence of any calls passing through the switching core equals the number of communication paths for that class under the prevailing management allocation scheme.

43. The controller according to claim 42 wherein a prevailing management allocation scheme fully utilizes transmission ports of one of a group of two interfaces employed for the pre-provisioning of communication paths of a particular class of calls in the absence of any calls passing through the switching core.

44. The controller according to claim 38 for controlling at least one Digital Cross-connect System (DCS), the controller comprising:
(a) at least one router for determining at least one communication path through at least one DCS in response to signaling information from a signaling network; and
(b) at least one resource manager each interfacing with a router of said at least one router for providing instructions for communication path establishment and tear down in the switching core of an DCS of said at least one DCS in response to said signaling information.

45. The controller according to claim 44 wherein at least two routers exchange routing information directly therebetween.

46. The controller according to claim 44 and further comprising a call controller for exchanging signaling information with the signaling network.

47. The controller according to claim 44 wherein the signaling network is the Signaling System 7.

48. The controller according to claim 38 wherein an allocation scheme is dependent on the Service Level Agreement (SLA) between a subscriber and an Application Service Provider (ASP).

49. The controller according to claim 38 wherein an allocation scheme is temporally dependent.

50. A signaling gateway including a switching core controller according to claim 38.

51. A telecommunication switching device including a switching core controller according to claim 38.

52. A telecommunication system including a switching core controller according to claim 38.

53. The controller according to claim 41 for controlling at least one Digital Cross-connect System (DCS), the controller comprising:

(a) at least one router for determining at least one communication path through at least one DCS in response to signaling information from a signaling network; and (b) at least one resource manager each interfacing with a router of said at least one router for providing instructions for communication path establishment and tear down in a switching core of a DCS of said at least one DCS in response to said signaling information.

54. The controller according to claim 41 wherein an allocation scheme is dependent on the Service Level Agreement (SLA) between a subscriber and an Application Service Provider (ASP).

55. The controller according to claim 41 wherein an allocation scheme is temporally dependent.

56. A signaling gateway including a switching core controller according to claim 41.

57. A telecommunication switching device including a switching core controller according to claim 41.

58. A telecommunication system including a switching core controller according to claim 41.

59. The controller according to claim 41 wherein a load balancing allocation scheme restricts the routing of an incoming call to a sub-set of the available transmission ports of the logical entity.

60. The controller according to claim 41 wherein a load balancing allocation scheme is dependent on the availability of transmission ports of the mediation devices of a logical entity.

* * * * *